United States Patent Office 3,495,008
Patented Feb. 10, 1970

3,495,008
METHODS OF TREATMENT OF PAIN IN MAMMALS WITH SUBSTITUTED METHYLENEDIOXYBENZAMIDES
Michel Leon Thominet, Paris, France, and Edward L. Engelhardt, Gwynedd, Pa., assignors to Societe d'Etudes Scientifiques et Industrielles de l'Ile-de-France, Longjumeau, Essonne, France, a corporation of France
No Drawing. Original applications June 3, 1965, Ser. No. 461,167, now Patent No. 3,370,066, dated Feb. 20, 1968, and Nov. 22, 1967, Ser. No. 684,957, now Patent No. 3,423,512, dated Jan. 21, 1969. Divided and this application Sept. 19, 1968, Ser. No. 760,975
Claims priority, application France, June 9, 1964, 977,661, 977,663
Int. Cl. A61k 27/00
U.S. Cl. 424—282     3 Claims

ABSTRACT OF THE DISCLOSURE

Mammals afflicted with pain are administered parenterally or orally a substituted methylenedioxybenzamide. Such administration is particularly effective as shown by the conduct of tests with phenylbenzoquinone in the mouse.

---

This application is a division of the application, S.N. 461,167, filed June 3, 1965, now U.S. Patent No. 3,370,066, issued Feb. 20, 1968 and the copending application S.N. 684,957, filed Nov. 22, 1967, now U.S. Patent No. 3,423,512, issued Jan. 21, 1969.

This invention relates to methods of treatment of pain in mammals with methylenedioxybenzamides.

The substituted methylenedioxybenzamides utilized in this invention have the formula:

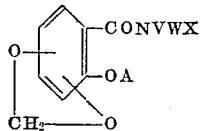

in which the methylenedioxy group is in the 3–4, 4–5 or 5–6 position; A is hydrogen, lower alkyl of 1 to 5 carbon atoms, such as methyl, isopropyl or isobutyl or lower alkenyl such as $CH=CH_2$ or $CH_2-CH=CH_2$; V is hydrogen, lower alkyl of 1 to 5 carbon atoms such as methyl, isopropyl or isobutyl, aryl, such as phenyl and substituted aryl, such as methylphenyl; W is lower alkylene of 2 to 4 carbon atoms, such as:

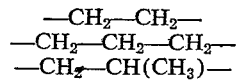

or

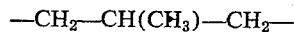

and X is an N-di lower alkylamino having the same of different alkyls of 1 to 5 carbon atoms or a 5 or 6 membered heterocyclic nitrogenous organic nucleus with a nitrogen atom thereof connected to a carbon atom of W, such, as those derived from morpholine, piperidine, pyrrolidine, piperazine, N-alkylpiperazine and imidazole.

The substituted methylenedioxybenzamides utilized in this invention are prepared by reacting methylenedioxybenzoic acid with Woodward's Reagent, i.e., 3′-sulfonate of N-ethyl-5-phenylisoxazolium (Woodward, J. Am. Chem. Soc. 1961, 83,1010). The resulting product is reacted with a diamine having the formula:

$H_2NVWX$ to produce the desired substituted methylenedioxybenzamide. The sequence of reactions is represented as follows when X of the diamine is an N-di lower alkylamine:

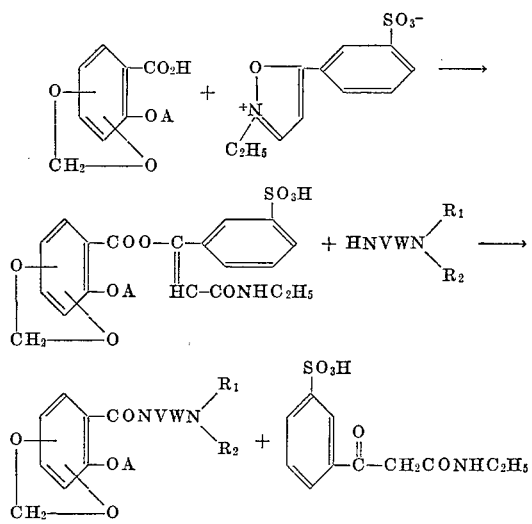

The compositions used in this invention possess significant pharmacological properties and can be utilized in the treatment of emesis, pain, disorders of the nervous system and psychotic disorders.

The invention includes the utilization of the salts of the basic amides described above and the pharmaceutically acceptable addition salts of such basic amides.

The acid salts of the substituted methylenedioxybenzamides are produced by causing the benzamide base to react with an acid, such as hydrochloric acid, hydrobromic acid, hydroiodic acid, phosphoric acid, sulfuric acid, citric acid, tartaric acid and lactic acid. Ethane sulfonic acid or acids, such as diphenylacetic acid, produce salts substantially insoluble in water and permit a slow absorption of the composition when administered, thereby effecting prolonged action of the composition.

The quaternary ammonium derivatives are obtained by reacting the substituted benzamide base with an aliphatic or aromatic agent, such as methyl chloride, methyl bromide, methyl iodide, dimethyl sulfate, methyl benzene sulfonate, methyl p-toluene sulfonate, ethyl bromide, propyl bromide and benzyl chloride.

The substituted methylenedioxybenzamides of this invention possess significant pharmacological properties and may be used, incorporated in or combined with pharmaceutically acceptable carriers.

A more comprehensive understanding of this invention is obtained by reference to the following examples of compounds utilized in the practice of the methods of this invention.

EXAMPLE I

N-(2-diethylaminoethyl)-2-methoxy-3,4-methylenedioxybenzamide 37.9 g. (0.193 mol) of 2-methoxy-3,4-methylenedioxybenzoic acid and 19.5 g. (0.193 mol) of triethylamine are dissolved in 400 ml. of anhydrous acetonitrile. This solution is added to a suspension of 49 g. (0.193 mol) of 3′-sulfonate of N-ethyl-5-phenylisoxazolium in 600 ml. of anhydrous acetonitrile cooled to 0° C., then stirred 45 minutes at ordinary temperature. The reaction mixture is cooled at 0° C. and 45 g. (0.386 mol) of N,N-diethylethylene diamine are added under agitation. The solid dissolves slowly, is agitated for four hours at ordinary temperature and allowed to stand overnight.

The solution obtained is then concentrated to a low volume under vacuum. Water, benzene and 20 ml. of a 10 N solution of sodium hydroxide are added. The benzene layer is separated, washed with water, dried with sodium sulfate and the benzene distilled under vacuum. The residual oil obtained weighs 54.1 g. and is composed of N-(2-diethylaminoethyl) - 2 - methoxy-3,4-methylenedioxybenzamide. The base is dissolved in absolute alcohol and the solution is treated with 10% excess gaseous HCl dissolved in absolute alcohol. The warm solution is diluted with ether until the crystallization of the product is obtained. The hydrochloride is filtered and washed on the filter with ether. The yield is 46.2 g. having a melting point of 164–165° C. This yield is 73% of the theoretical. Analysis of the product having the empirical formula of $C_{15}H_{22}N_2O_4 \cdot HCl$ shows the following. Calculated: C, 54.46%; H, 7.01%; N, 8.47%. Found: C, 54.52%; H, 6.90%; N, 8.41%.

EXAMPLE II

N-(2-diethylaminoethyl)-2-methoxy-4,5-methylenedioxybenzamide 39.2 g. (0.2 mol) of 2-methoxy-4,5-methylenedioxybenzoic acid are dissolved in a mixture of 200 ml. of anhydrous acetonitrile and 20.5 g. (0.2 mol) of triethylamine. This solution is added, under agitation, to a solution of 50.5 g. (0.2 mol) of 3'-sulfonate of N-ethyl-5-phenylisoxazolium in 400 ml. of anhydrous acetonitrile. The mixture is cooled in an ice bath, is agitated for one hour, then for two hours at ordinary temperature. To the solution cooled at 0° C., there is added, under agitation, 45 g. (0.4 mol) of N,N-diethylethylene diamine. After remaining overnight at ordinary temperature, the solution obtained is concentrated under vacuum to a low volume. Benzene, water and 20 ml. of 10 N solution of sodium hydroxide are added. The benzene layer is separated, washed with water and dried with sodium sulfate. The benzene is removed under vacuum. The pale yellow residual oil weighs 50 g. It is dissolved in absolute alcohol and treated with 15% excess gaseous HCl dissolved in alcohol. The warm solution obtained is diluted with ether. The N-(2-diethylaminoethyl)-2-methoxy-4,5-methylenedioxybenzamide hydrochloride formed precipitates. It is dried and washed on a filter with ether. The yield is 35.5 g. of the hydrochloride having a melting point of 213–215° C. and is 63% of the theoretical. Analysis of the hydrochloride having the empirical formula of $C_{15}H_{22}N_2O_4 \cdot HCl$ shows the following. Calculated: C, 54.46%; H, 7.01%; N, 8.47%. Found: C, 54.44%; H, 6.90%; N, 8.62%.

Desirably, the substituted benzamides, such as those described in Examples I and II are associated with solid or liquid pharmaceutically acceptable carriers for oral or parenteral administration in the treatment of pain. The substituted benzamides and carriers may be in the form of capsules, tablets, powders, sterile solutions of water or other solvents or other dosage forms. The substituted benzamides may be admixed with diluents and adjuvants, such as lactose, gums, stearic acid or talc.

Compounds utilized in the methods of treatment of this invention with the phenylbenzoquinone test in the mouse gave the following results:

N - (2-diethylaminoethyl)-2-methoxy-3,4-methylenedioxybenzamide: D.E. 50 (base)=59.9 mg./kg. I.P.

N - (2-diethylaminoethyl)-2-methoxy-4,5-methylenedioxybenzamide: Protection of 33% at 40 mg./kg. I.P.

The compositions may be administered in the form of a pharmacologically acceptable salt, in the form of tablets, injectable ampoules, suppositories, saccharine, granules or syrup.

What is claimed is:

1. The method of treating a mammal afflicted with pain comprising administering to said mammal an effective amount of a compound selected from the group consisting of free bases, nontoxic salts and quaternary ammonium derivatives thereof; said free bases having the formula:

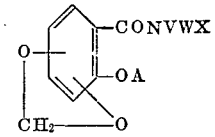

in which the methylenedioxy radical is in a position selected from the group consisting of the 3–4, 4–5 and 5–6 positions; A is a member selected from the group consisting of hydrogen, lower alkyl and lower alkenyl; V is a member selected from the group consisting of hydrogen, lower alkyl, phenyl and methylphenyl; W is lower alkylene; and X is selected from the group consisting of N-di lower alkylamino and 5 and 6 membered heterocyclic nitrogenous nuclei with a nitrogen atom thereof connected to a carbon atom of W, wherein said nuclei is morpholino, piperidino, pyrrolidino, piperazino, N-alkylpiperazino or imidazolo.

2. The method in accordance with claim 1, in which the compound administered is N-(2-diethylaminoethyl)-2-methoxy-3,4-methylenedioxybenzamide.

3. The method in accordance with claim 1, in which the compound administered is N-(2-diethylaminoethyl)-2-methoxy-4,5-methylenedioxybenzamide.

References Cited

UNITED STATES PATENTS 2,362,128 11/1944 Gertler et al. _____ 260—340.5
2,251,287 8/1941 Lott _____ 260—340.5

ALBERT T. MEYERS, Primary Examiner
S. J. FRIEDMAN, Assistant Examiner

U.S. Cl. X.R.

424—248, 250, 267, 273, 274